United States Patent [19]
Kusano

[11] Patent Number: 6,061,355
[45] Date of Patent: May 9, 2000

[54] ATM TRANSMISSION SYSTEM AND METHOD HAVING VARIABLE TRANSMISSION PROCESS FUNCTIONS AND ROUTE CONFIGURATION

[75] Inventor: Toshihiko Kusano, Tokyo, Japan

[73] Assignee: NEC Corporation, Tokyo, Japan

[21] Appl. No.: 08/929,169

[22] Filed: Sep. 15, 1997

[30] Foreign Application Priority Data

Sep. 17, 1996 [JP] Japan .................................. 8-245331

[51] Int. Cl.[7] .............................. H04L 12/28; H04L 12/56
[52] U.S. Cl. ........................... 370/395; 370/398; 370/399
[58] Field of Search .................................... 370/230, 232,
370/253, 394, 395, 398, 399, 401

[56] References Cited

U.S. PATENT DOCUMENTS 5,357,510  10/1994  Norizuki et al. .......................... 370/395
5,557,611   9/1996  Cappellari et al. ....................... 370/395
5,790,546   8/1998  Dobbins et al. .......................... 370/400

Primary Examiner—Michael Horabik
Assistant Examiner—Kevin C. Harper
Attorney, Agent, or Firm—Whitham, Curtis & Whitham

[57] ABSTRACT

An ATM transmitter distributes an ATM transmission process function to plural electronic circuit packages and performs transmission process by forming routes between the plural circuit packages. The routes can be flexibly varied while a configuration of a variety of process functions are managed. The cell distribution section which has plural input and output terminals connected to respective electronic circuit packages forms a route among respective ones of the arbitrary input and output terminals so that receive ATM cells are input and output between respective electronic circuit packages. Process functions are arranged for each electronic circuit package. The function configuration of all the electronic circuit packages is previously set. Thus, a route formation is indicated to the cell distribution section. In other case, input and output terminals for each route are sequentially arranged along the route. The control order of receive ATM cells is previously set. Thus, a receive ATM cell transmission process is performed by the cell distribution section. Moreover, the number of times ATM cells are input and output is arranged for each input and output terminal so that the cell distribution section repeats an input and output operations to the same input and output terminal.

17 Claims, 8 Drawing Sheets

| PASS ID | S | INPUT | OUTPUT |
|---|---|---|---|
| 50 | 1 | SLOT 8 | SLOT 10 |
| | 1 | SLOT 10 | SLOT 7 |
| | 1 | SLOT 7 | SLOT 9 |
| | 1 | SLOT 9 | SLOT 1 |
| | | | |
| | | | |

S:SUFFIX

FIG.7

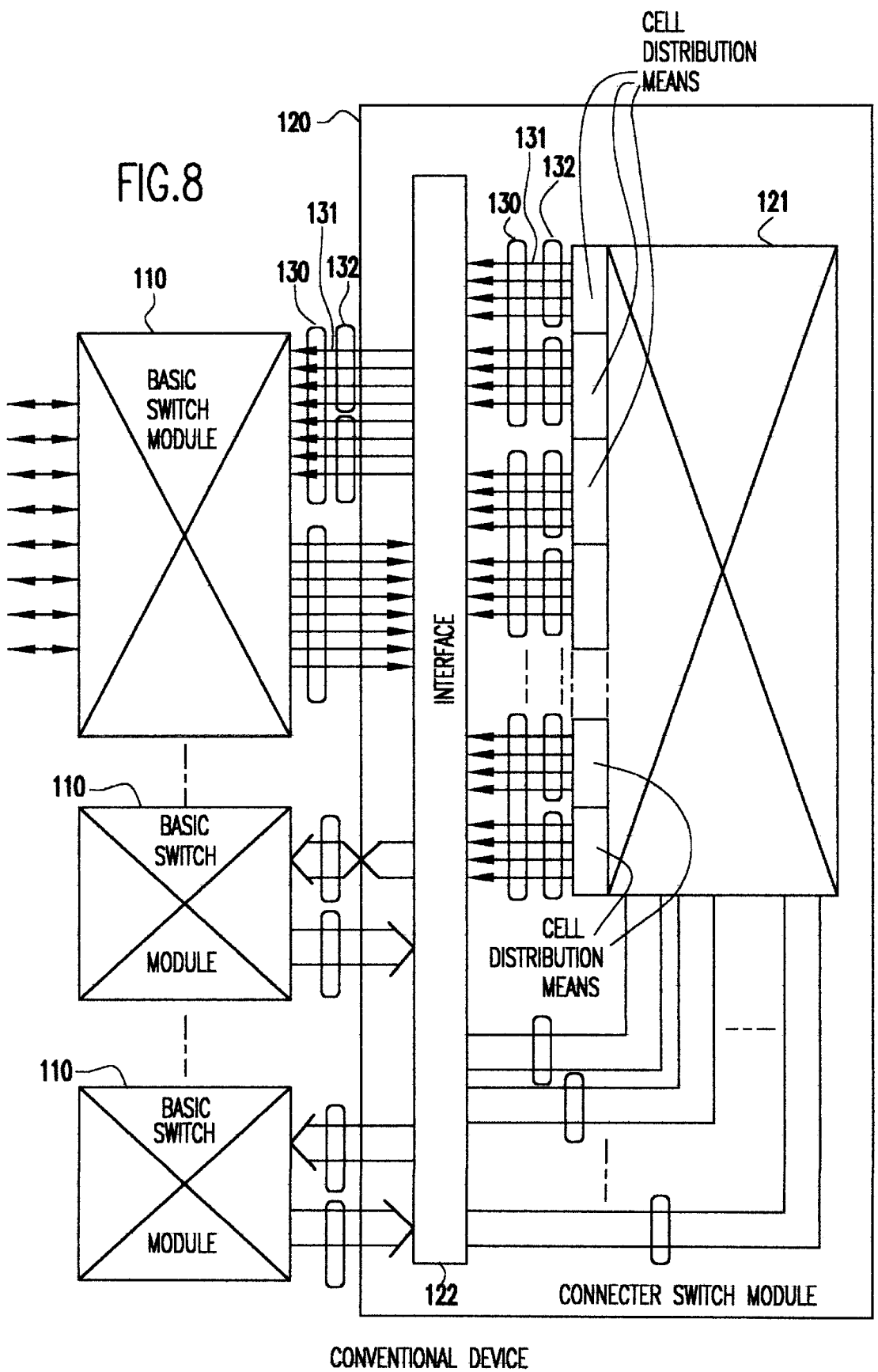

ATM TRANSMISSION SYSTEM AND METHOD HAVING VARIABLE TRANSMISSION PROCESS FUNCTIONS AND ROUTE CONFIGURATION

BACKGROUND OF THE INVENTION

The present invention relates to an asynchronous transfer mode (ATM) transmission system that performs transmission process by distributing an asynchronous transfer mode (hereinafter, sometimes abbreviated to ATM) transmission processing function to plural electronic circuit packages and forming routes between the electronic circuit packages. Particularly, the present invention relates to an ATM system that can flexibly vary the transmission route while the configurations of various process functions are being managed. Furthermore, the present invention relates to an ATM transmission method.

Generally, ATM transmission is executed by plural process functions. In an ATM transmission system, the process functions are built in various kinds of electronic circuit packages. An ATM transmission processing section is configured by serially arranging the electronic circuit packages to execute sequentially signal processes.

Each electronic circuit package packages only part of a series of transmission processes in the processing section. It is important that the parts are serially connected to make a set of process functions so that a specific ATM cell can be processed. In order to meet such a demand, various types of ATM transmission systems have been proposed.

FIG. 8 is a block diagram showing the configuration of a conventional ATM switching system.

The ATM switching system is disclosed in JA-143135/1995. Plural basic switch modules 110, . . . , 110 are connected to the connection switch module 120.

The connection switch module 120 has an output bus 130 connected to the basic switch modules 110. A set of plural output lines 131, . . . ,131 forming the output bus 130 acts as one output line bundle 132. In the output line bundles 132, output lines 131, . . . ,131 unused are used to transfer ATM cells, in place of the output lines 131, . . . , 131 in the same set.

When the traffic on one output line 131 becomes heavy because of a rush of ATM cells, the heavy traffic is distributed to unused output lines 131 in the same set. Thus, the effective throughput of the connection switch module 120 can be improved.

The connection switch module 120 has a buffer function by which excessive traffic acceptable by each of output lines 131, . . . , 131 can be temporarily held. Since the excessive traffic is distributed to unused output lines 131, it is not needed to hold temporarily the excessive traffic. Hence, the maximum buffer function of the connection switch module 120 can be reduced.

The traffic allowable in the same set increases because of the is maximum buffer function is maintained. Hence the connection switch module 120 can expand its switching capacity by the remaining buffer function. The connection switch module 120 can expand its switching capacity corresponding to the increment by increasing connectable basic switch modules 110.

The connection switch model 120 can expand its switching capacity or add basic switch modules, without increasing hardware amount such as buffer function.

However, when the ATM transmission process function in the conventional ATM transmission system is changed or added, there have been the following problems:

Firstly, since the object to be expanded is limited to the basic switch modules 110, the process function in the ATM transmission cannot be varied and added arbitrarily and flexibly in units of electronic circuit packages.

Secondary, since the premise is that plural output lines 131, . . . , 131 are aggregated as one output line bundle 132 to the same basic switch module, the electronic circuit package is fixed inevitably. Hence, an arbitrary connection configuration cannot be realized that an ATM transmission process function is varied and added later.

SUMMARY OF THE INVENTION

The objective of the present invention is to solve the above-mentioned problems. The objective of the invention is to provide an ATM transmission system that performs a transmission process by decentralizing an ATM transmission process function into plural electronic circuit packages and then forming a transmission route between the electronic circuit packages.

Another objective of the present invention is to provide an ATM transmission system that can manage the configurations of various process functions while the transmission route can be flexibly varied.

Still another objective of the present invention is to provide an ATM transmission method which can flexibly vary a transmission route.

These and other objectives of the present invention are achieved by the ATM transmission system comprising plural electronic circuit packages having respective process functions in ATM transmission, each of the electronic circuit packages subjecting a receive ATM cell to a transmission process; and a cell distribution section having plural input/output terminals to be connected to the plural electronic circuit packages, for forming respective routes between arbitrary input/output terminals and arbitrary input/output terminals, and exchanging a receive ATM cell between the electronic circuit packages via the routes.

In the ATM transmission system according to the present invention, the cell distribution section has plural input/output terminals respectively connected to electronic circuit packages. Routes are respectively formed between arbitrarily input/output terminals. A receive ATM cell is exchanged between electronic circuit packages via the routes.

The ATM transmission system further comprises a control section for arranging a process function for each of the electronic circuit packages, previously setting the function configurations of the plural electronic circuit packages, and instructing the cell distribution section to form a cell route with reference to the function configuration.

According to the ATM transmission system, a process functions is arranged for each of the electronic circuit packages. The function configurations of the plural electronic packages are previously set. The cell distribution section is instructed to form a cell route with reference to the function configuration.

The ATM transmission system further comprises a control section for sequentially arranging the input/output terminals in the routes along a transmission route, and previously setting a control sequence of a receive ATM cell, and controlling the cell distribution section to execute a transmission process of the receive ATM cell according to the control sequence.

According to the control system, the input/output terminals in the routes are sequentially arranged to the control section along a transmission route. A control sequence of a receive ATM cell is previously set. The cell distribution section controls to execute a transmission process of the receive ATM cell according to the control sequence.

In the present invention, the control section arranges the number of times an ATM cell is input and output for each input/output terminal and controls the cell distribution section to repeat an input/output operation to the same input/output terminal the number of times arranged.

According to the ATM transmission system, the control section arranges the number of times an ATM cell is input and output for each input/output terminal and controls the cell distribution section to repeat an input/output operation to the same input/output end the number of times arranged.

According to the present invention, an ATM transmission method comprises the steps of preparing plural electronic circuit packages, a control section, and a cell distribution section having plural input/output terminals to be connected to the plural electronic circuit packages; forming respective routes between arbitrary input/output terminals and arbitrary input/output terminals; and exchanging a receive ATM cell between the electronic circuit packages via the routes.

The method further comprises the steps of arranging a process function for each of the electronic circuit packages, previously setting the function configurations of the plural electronic circuit packages, and instructing the cell distribution section to form a cell route with reference to the function configuration.

The method further comprises the steps of sequentially arranging the input/output terminals in the routes along a transmission route, previously setting a control sequence of a receive ATM cell, and controlling the cell distribution section to execute a transmission process of the receive ATM cell according to the control sequence.

The method further comprises the step of arranging the number of times an ATM cell is input and output for each input/output terminal, and controlling the cell distribution section to repeat an input/output operation to the same input/output terminal the number of times arranged.

BRIEF DESCRIPTION OF THE DRAWINGS

This and other objects, features and advantages of the present invention will become more apparent upon a reading of the following detailed description and drawings, in which:

FIG. 7 is a control table in the cell distribution section of FIG. 4; and

FIG. 8 is a block diagram showing a conventional ATM switching system.

DESCRIPTION OF THE EMBODIMENTS

Next, an embodiment of the present invention will be described below in detail with reference to the attached drawings.

Figure 1:
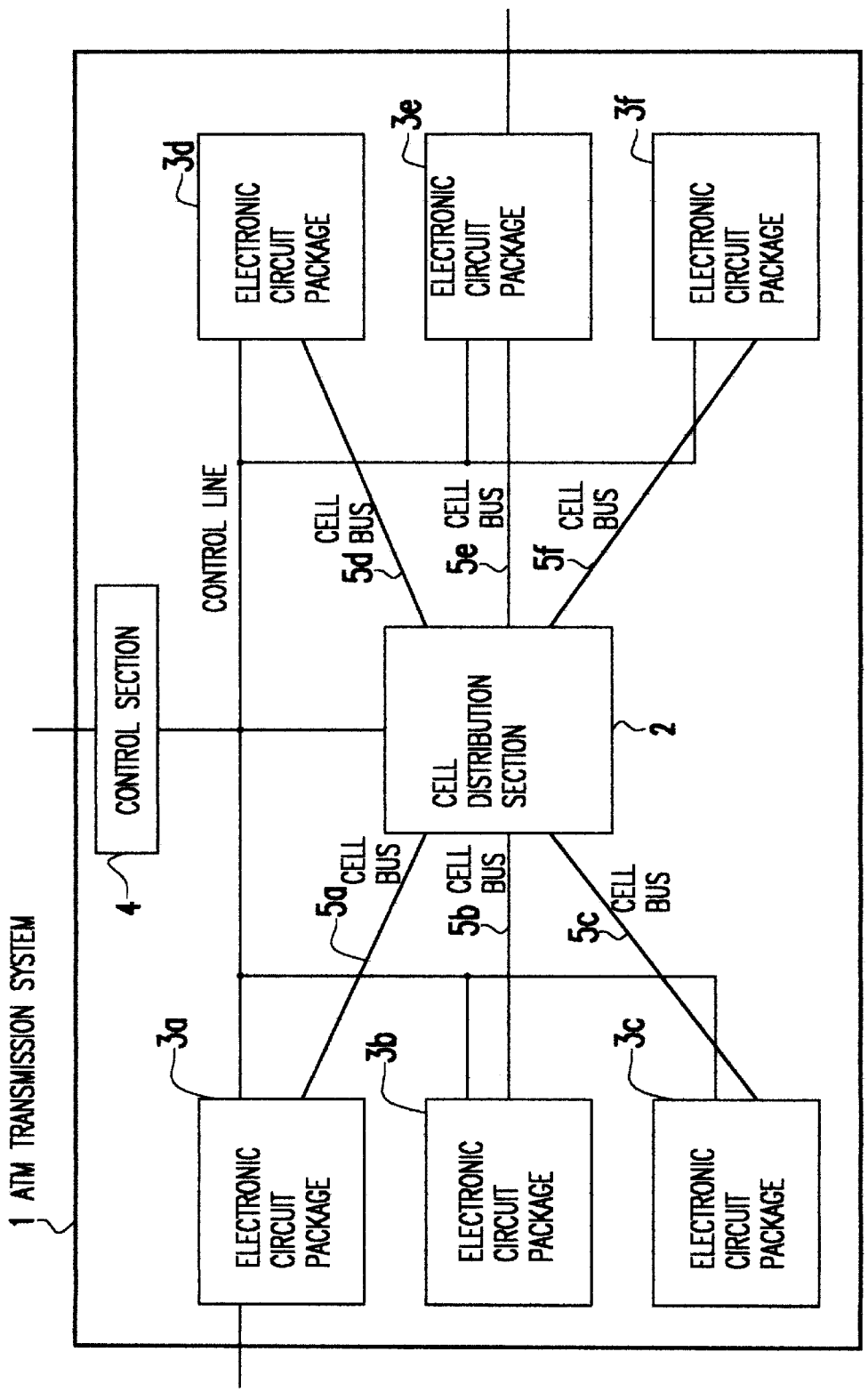
FIG. 1 is a block diagram showing the configuration of an ATM transmission system according to an embodiment of the present invention.

FIG. 1 is a block diagram illustrating an asynchronous transfer mode (ATM) system according to an embodiment of the present invention.

Referring to FIG. 1, a novel ATM system 1 which processes ATM transmission includes a cell distribution section 2 for distributing ATM cells in the system 1, plural electronic circuit packages 3a to 3f for respectively processing distributed ATM cells, a control section 4 for controlling the cell distribution section 2 and the electronic circuit packages 3a to 3f, cell buses 5a to 5f through which ATM cells are mutually exchanged between the electronic circuit packages 3a to 3f and the cell distribution section 2, and a control line 6 for transmitting control signals to respective electronic circuit packages 3a to 3f and the cell distribution section 2 and receiving control signals from them.

Figure 2:
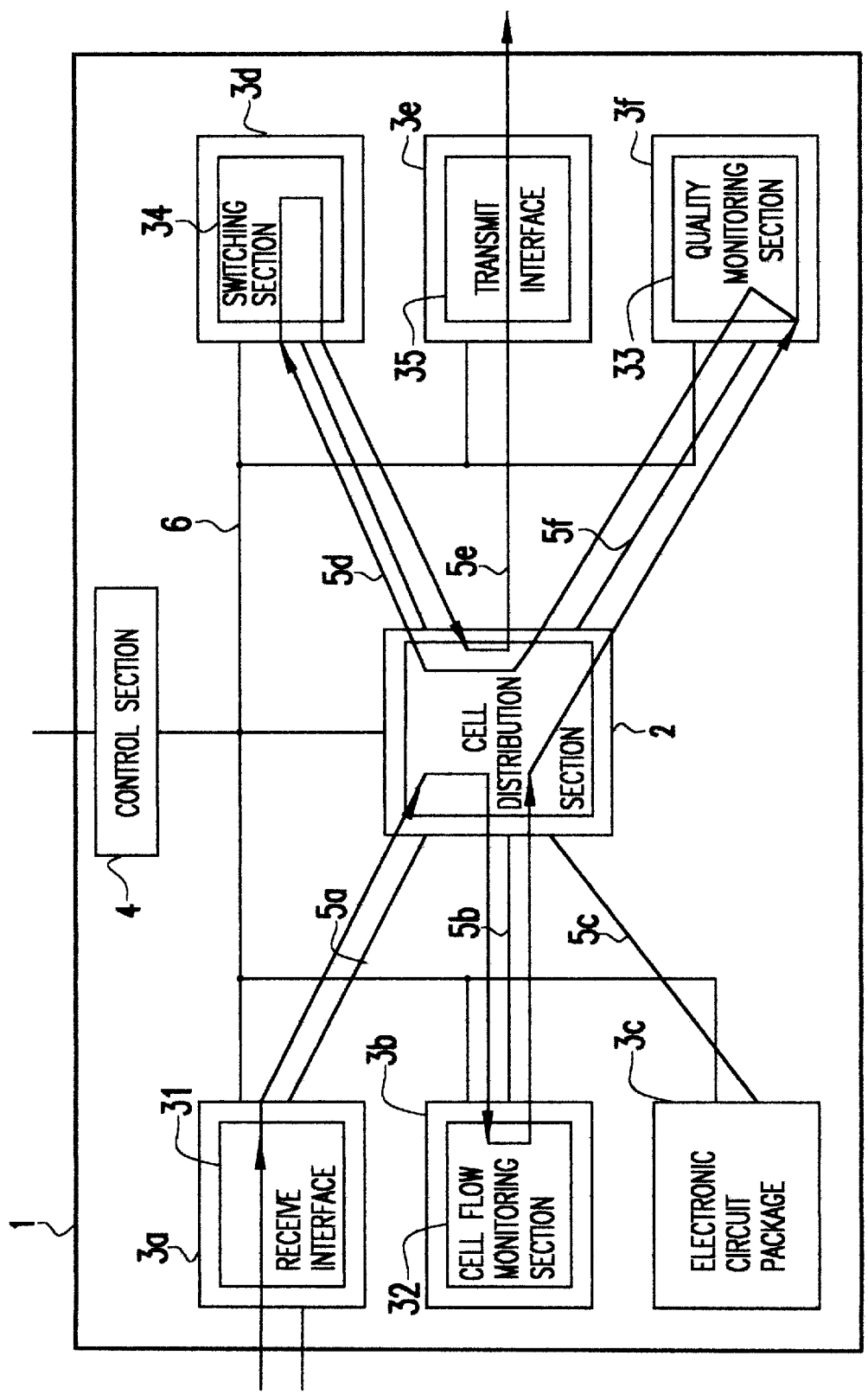
FIG. 2 is a route diagram illustrating an ATM cell distribution route in an ATM transmission system according to an embodiment of the present invention.

FIG. 2 is a route diagram showing an example of a distribution route in the embodiment of FIG. 1.

The cell distribution section 2 has plural input/output terminals to be respectively connected to the electronic circuit packages 3a to 3e and forms an ATM cell distribution route between a given input/output terminal and a given input/output terminal according to a predetermined program.

Two electronic circuit packages 3a and 3e are interface packages each which transmits the main signal for an ATM cell to an external system and receives the same therefrom. Three electronic circuit packages 3b, 3f, and 3d are function packages each which has various functions needed for an ATM cell transmission process.

The cell distribution section 2 are mutually connected to respective electronic circuit packages 3a to 3e in a star-type bus configuration. In other connection configurations, when electronic circuit packages 3a to 3e are additionally connected, they may be connected, for example, in a multi-branch-type bus configuration if the transfer capability of the cell bus matches with the process capability of the cell distribution section 2.

The ATM cell transfer process, for example, is performed through five electronic circuit packages 3a, 3b, 3f, 3d, and 3e. The cell distribution section 2 forms a distribution route by connecting the input terminal receiving the cell bus 5a to the output terminal connected to the cell bus 5b, connecting the input terminal receiving the cell bus 5b to the output terminal connected to the cell bus 5f, connecting the input terminal receiving the cell bus 5f to the output terminal connected to the cell bus 5d, and connecting the input terminal receiving the cell bus 5d to the output terminal connected to the cell bus 5e.

Figure 3:
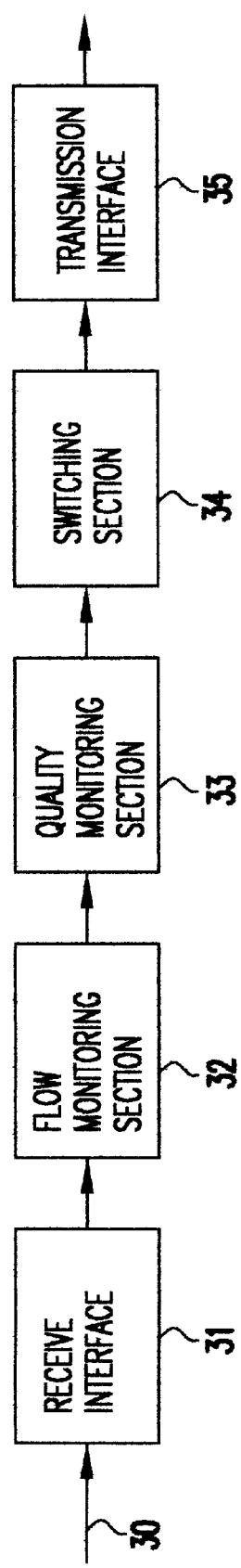
FIG. 3 is a block diagram showing process functions in the distribution route shown in FIG. 2.

FIG. 3 is a block diagram illustrating the configuration for performing various process functions in the distribution route shown in FIG. 2.

The receive ATM cell flow 30 flows along a distribution route and is sequentially processed through a receive interface 31, an input cell flow monitoring section 32, a quality monitoring section 33, a switching section 34, and a transmit interface 35. The processed cell flow is transmitted as a transmit ATM cell flow to the next ATM transmitter.

The receive interface 31 is a function implemented to the electronic circuit package 3a and executes a process of converting a receive light signal into an electrical signal, a frame termination process such as ATM, and a cell synchronous process.

The input cell flow monitoring section 32 is a function implemented in the electronic circuit package 3b and monitors a traffic status by measuring the flow of a user cell, OAM cell, and the like in an ATM cell. The OAM cell is an operation and maintenance cell for operation, management and maintenance.

The quality monitoring section 33 is a function implemented in the electronic circuit package 3f. The quality monitoring section 32 specifies a user cell flow in which a VPI (virtual path identifier (logical path identifier)) and a VCI (virtual channel identifier (logical channel identifier)) have the same value, uses an OAM cell to the transfer content of the user cell flow, and monitors the presence or absence of cyclic redundancy check (CRC) code error occurrence.

The switching section 34 is a function implemented in the electronic circuit package 3d. The switching section 34 identifies the VPI set value and the VCI set value included in a header and performs a VP and VC switching operation to an ATM cell flow.

The transmit interface 35 is a function implemented in the electronic circuit package 3e. The transmit interface 35 executes recalculation and resetting of a header error control (HEC) so that a frame creating process such as ATM as well as an electrical signal to light signal converting process are performed.

Figure 4:
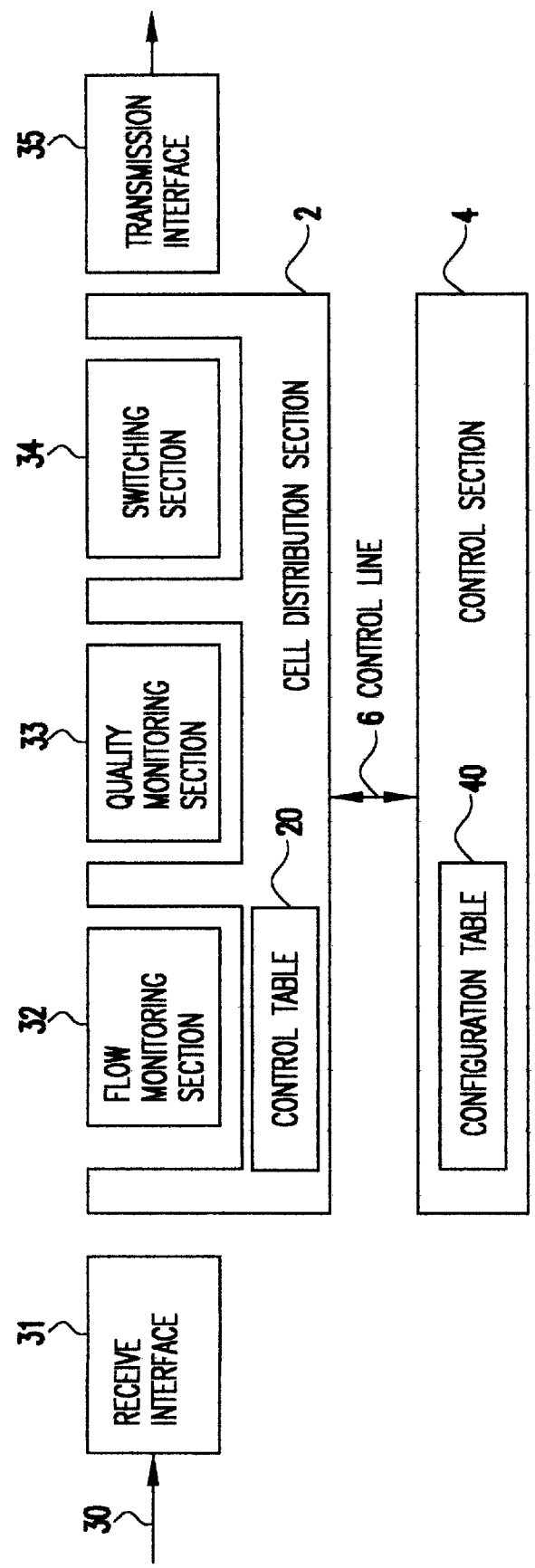
FIG. 4 is a diagram showing the cell distribution section for each process function shown in FIG. 3.

FIG. 4 is a block diagram illustrating the configuration in which the cell distribution section acts to the process functions of FIG. 3.

The cell distribution section 2 intervenes between the receive interface 31 and the input cell flow monitoring section 32 via the cell buses 5a and 5b, between the input cell flow monitoring section 32 and the quality monitoring section 33 via the cell buses 5b and 5f, and between the quality monitoring section 33 and the switching section 34 via the cell buses 5d to 5f, and between the switching section 34 and the transmit interface 35 via the cell buses 5d and 5e, thus deciding its input/output directions.

In the cell distribution section 2, a control table 20 showing the relationship between each ATM cell flow and a distribution route is arranged under control of the control section 4. A process of transmitting each ATM cell flow is configured as a series of functional flow by retrieving the control table 20 and repeating input and output operations to process functions 31 to 35.

The control section 4 has a configuration table 40 on which relationships between various functions including process functions 31 to 35 and electronic circuit packages 3a to 3f are arranged. The control section 4 controls the cell distribution section 2 via the control line 6 with reference to the configuration table 40 and manages functional configurations defined in the cell distribution section 2.

Hence, a manager of an ATM transmitter can designate a series of process procedures to the control section 4 by using a management terminal directly connected to the ATM transmitter or a remote terminal via the control lines, specifying each ATM cell flow using VPI and VCI values, and selecting each function.

Figure 5:
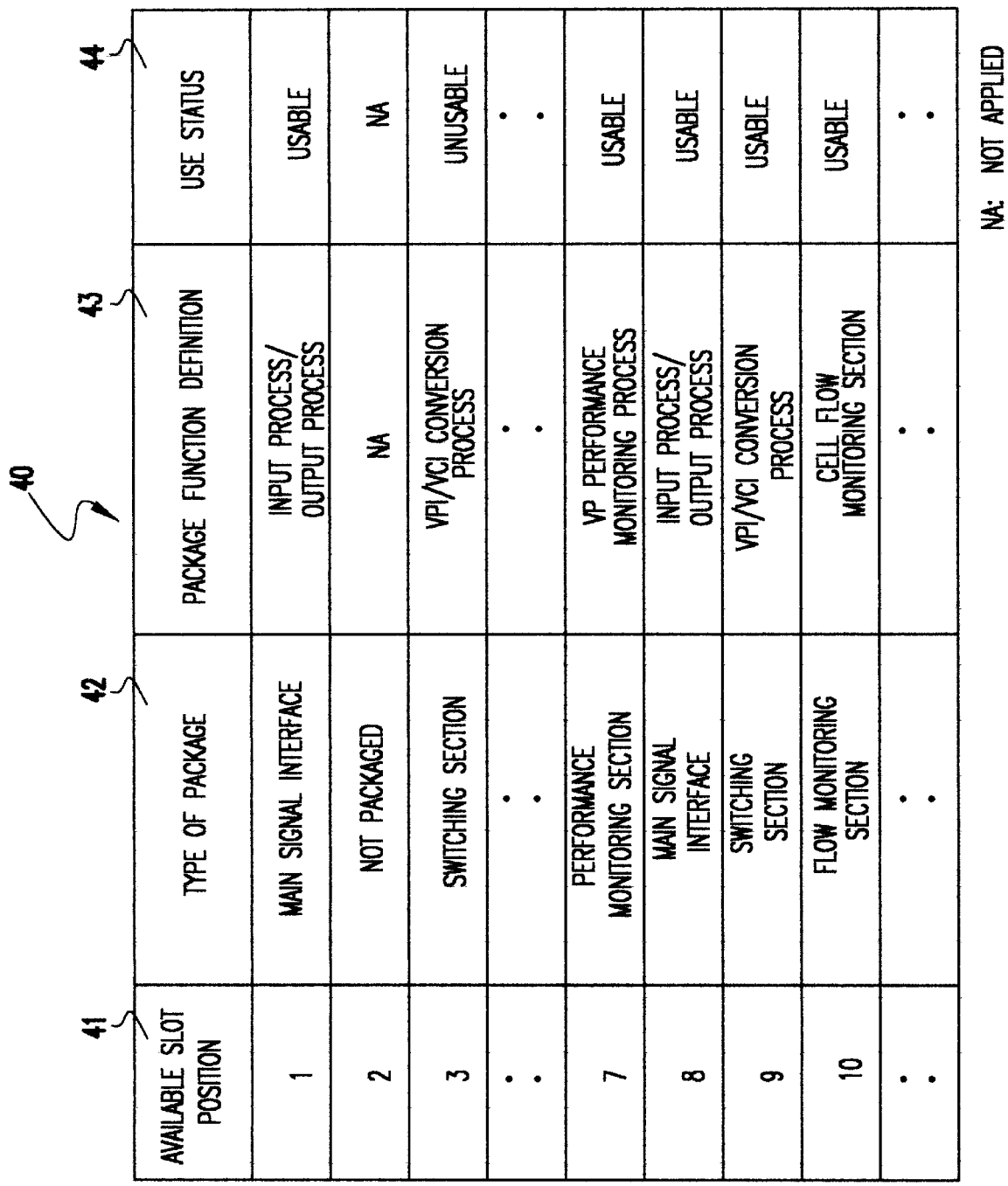
FIG. 5 is a configuration table used in the control section shown in FIG. 4.

FIG. 5 shows a configuration table used for the control section in FIG. 4.

Now, it is assumed that a functional configuration shown in FIG. 4 acts as a virtual device and that various functions are arranged in the virtual device using the configuration table 40.

The configuration table 40 has columns for virtual implement slot positions 41. Proper names of various process functions 31 to 35 are shown in the columns for package types 42. Concrete process contents of various process functions 31 to 35 are shown in the columns for package function definition 43. Whether or not ATM cells can be processed in the current time is shown in the columns for use status 44.

The implement slot location 41 is defined as a slot number for implementing various functions to the ATM transmitter. Various functions are sequentially arranged according to numbers shown in the columns for the implement slot locations 41.

The package function definition 43 can be abbreviated using functional codes based on a inherent definition of ATM transmission.

The use status 44 shows a usable status if each of process functions 31 to 35 has room in the load status and is not in a failure status and shows a not-applied status (NA) if any process function is not implemented.

Figure 6:
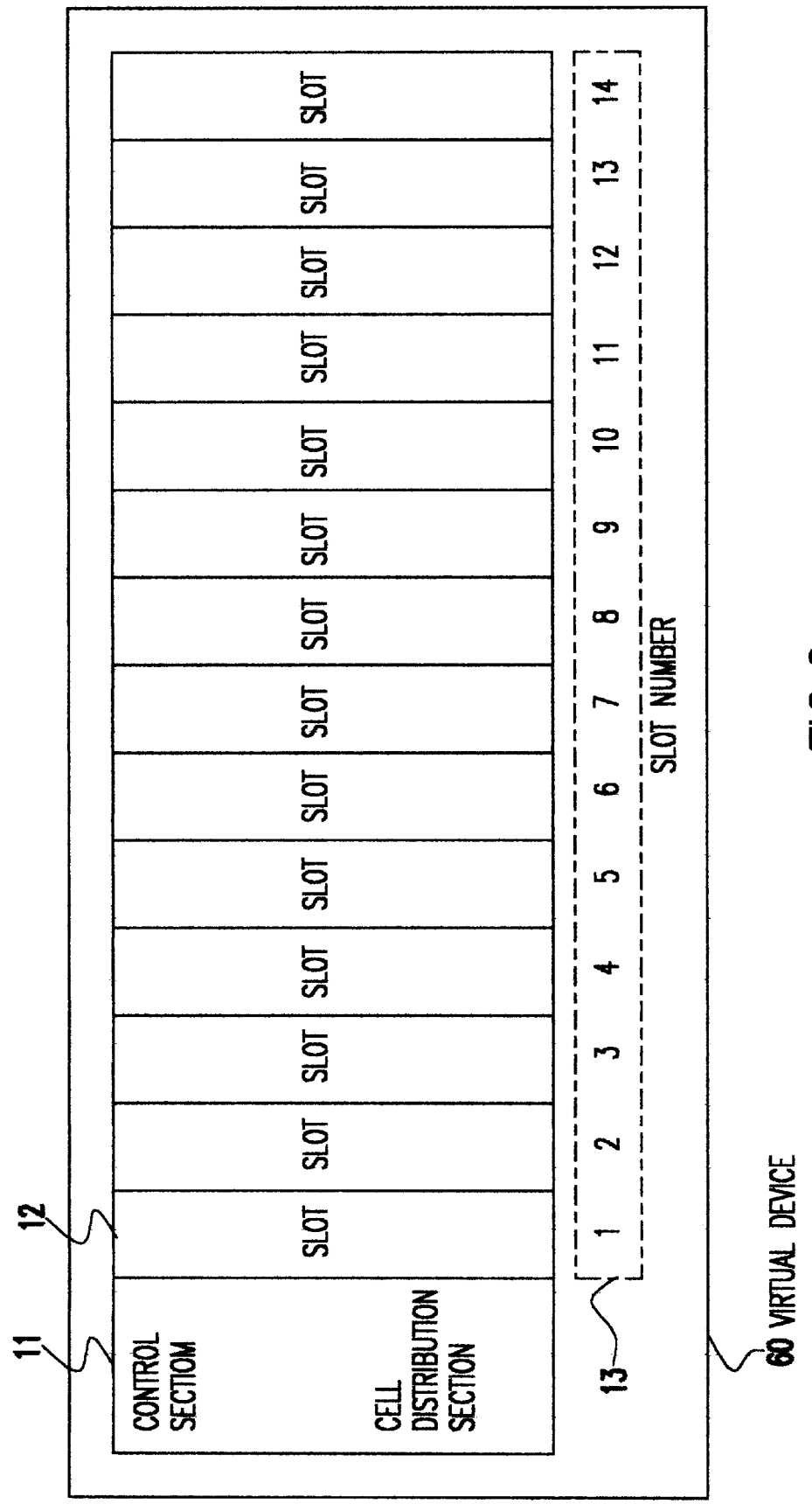
FIG. 6 is a diagram showing a virtual device in FIG. 5.

FIG. 6 is a diagram showing a virtual device 60 with the configuration table in FIG. 5.

This virtual device includes an inherent processing section 11 having the functions corresponding to the control section 4 and the cell distribution section 2, implement slots 12a to 12n in which any electronic circuit packages 3a to 3f can be implemented, and a slot number 13 showing the location of each of implement slots 12a to 12n. The slot numbers 13 is the number shown in the column of an implement slot location 41 on the configuration table 40.

The control section 4 selects implementation slot locations 41 necessary for each of the process functions 31 to 35 while it is retrieving the package type 42 on the configuration table 42. The control table 20 is formed by sequentially arranging the selected implementation slot locations 41.

The ATM cell process procedures set to the cell distribution section 2 by the control section 4 programs are programmed on the complete control table 20.

When the electronic circuit packages 3a to 3f correspond respectively and sequentially to various functions, the slot number 13 may show physical implementation locations of the electronic circuit packages 3a to 3f.

Figure 7:
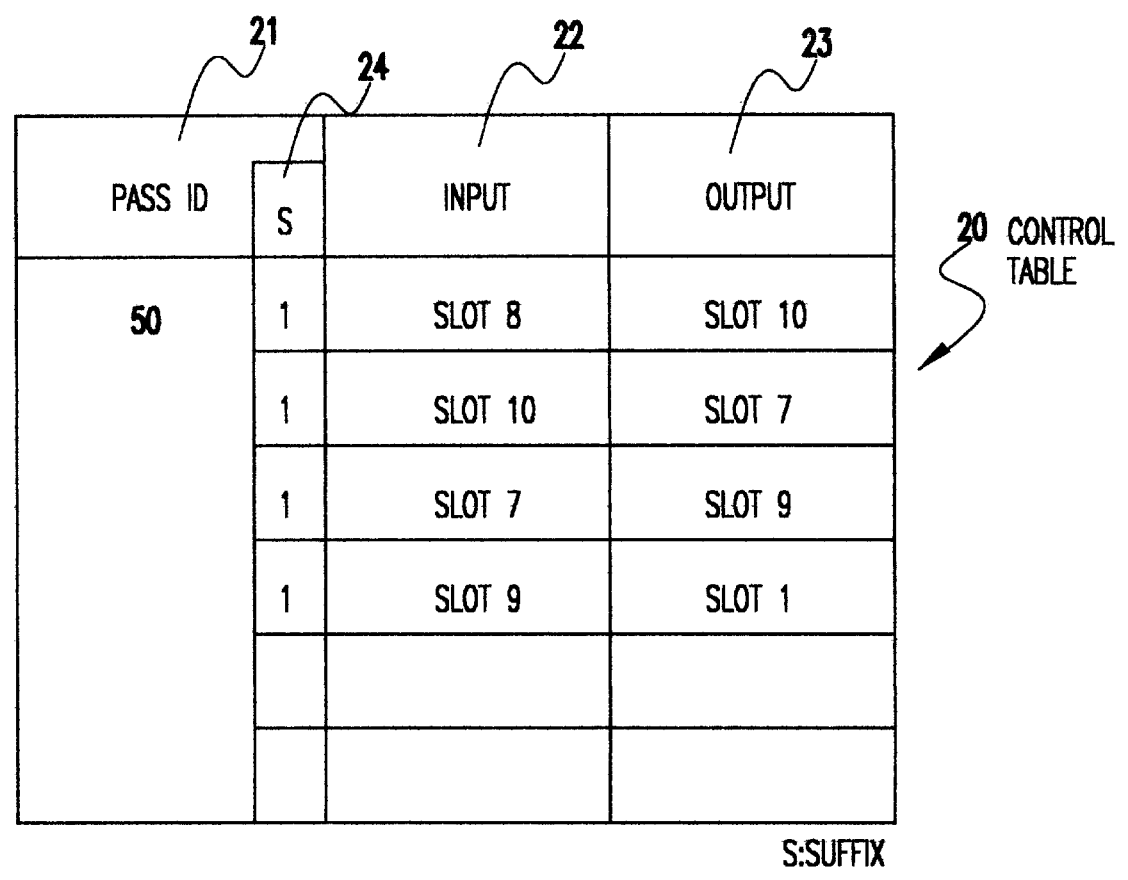

FIG. 7 shows a control table for the control section in FIG. 4.

The control table 20 has the column for an inherent path ID21, the column for an input 22 in which the input relations between the electronic circuit packages 3a to 3f and the cell distribution section 2 are shown with slot numbers, and the column for an output 23 showing the output relations of the outputs between the electronic circuit packages 3a to 3f and the cell distribution section 2.

When an ATM transmitter receives each of ATM cells, the control section 4 identifies the attribute of the receive ATM cell and adds an inherent path ID 21 to the receive ATM cell based on the identification result.

In this case, the distribution route for an ATM cell having a path ID (=50) is shown. The input from the main signal interface 31 of the slot 8 at the first stage acts as an output to the flow monitoring section 32 of the slot 10. The input from the slot 10 at the second stage acts as an output to the performance monitoring section 33 of the slot 7. The ATM cells are sequentially arranged according to the distribution route having the input/output relations of the remaining process functions 34 and 35.

At the third stage, the switching section 34 is packaged to two slot numbers 3 and 9. However, the slot number 3 is excluded from a candidate to be selected since it indicates "UNUSABLE" in the column for the use status 44. Instead, the slot number 9 is selected and arranged on the control table 20.

As described above, when there are plural slot numbers having the same process functions, the next slot indicating "USABLE" is selected according to the ascending order or descending order of the slot number.

The control table 20 is previously set in the cell distribution section 2 by means of the control section 4.

The cell distribution section 2 encodes the pass ID21 for each receive ATM cell and then decides the corresponding control table 20. Next, the input/output relations are sequentially retrieved from the first column of the decided control table 20.

Since all the passes ID21 are managed consistently by the control section 4, so that plural distribution routes are distinguished in the system and decided for each ATM cell.

A suffix S showing input and output counts is added to the pass ID21. There is the case where the same ATM cell is repeatedly input and output to the same slot number. The cell distribution section 2 reads the count indicated with the suffix S. The same slot number can be repeatedly input and output to the same ATM cell the number of times.

In the above-mentioned case, there is the case where the order of process functions 31 to 35 is varied or deleted or the order of electronic circuit packages 3a to 3f is varied or deleted. In this case, when the control section 4 varies the arrangement contents of the configuration table 40 and resets the control table 20 in the cell distribution section 2, the distribution section 2 can immediately vary the distribution route.

This is applicable to the case where various functions other than various functions 31 to 35 and elements other than electronic circuit packages 3a to 3f.

It should be noted that the present invention is not limited only to the foregoing embodiments. For example, the present invention is applicable to an ATM transmitter having at least seven electronic circuit packages and at least seven cell buses. It is possible, of course, that various modifications are made within the scope departing from the subject matter of the present invention.

As described above, the ATM transmitter according to the present invention has the following advantages:

Firstly, since the control section arranges arbitrary process functions on the configuration table, variation, deletion and addition can be flexibly realized in the units of electronic circuit packages and of process functions.

Secondly, the control section forms an arbitrary distribution route on the control table. The cell distribution route section can directly vary, delete, and add the distribution route based on the control table.

Therefore, when an ATM cell is transmitted between plural electronic circuit packages, an ATM transmitter which can flexibly vary the route can be provided while the configuration of various process functions of an ATM is being managed.

The entire disclosure of Japanese Patent Application No. 8-245331 filed on Sep. 17, 1996 including specification, claims, drawing and summary are incorporated herein by reference in its entirety.

What is claimed is:

1. An ATM transmission system comprising:
   plural electronic circuit packages having respective process functions in ATM transmission, each of said electronic circuit packages subjecting a receiving ATM cell to a transmission process;
   a control section having a first table programmed to define a relationship among transmission processes performed by at least a portion of said electronic circuit packages: and
   a cell distribution section having plural input/output terminals connectable to said plural electronic circuit packages and a second table defining a distribution route through said at least a portion of said electronic circuit packages said distribution route in said second table being formed from connections among respective ones of said input/output terminals and said at least a portion of said electronic circuit packages, said distribution route in said second table being defined by the programmed relationship among said transmission processes in said first table, said cell distribution section controlling a flow of a receive ATM cell through said at least a portion of said electronic circuit packages via said distribution route.

2. The system of claim 1, further comprising
   means for previously setting a functional configuration of said transmission processes of said at least a portion of said plural electronic circuit packages, and instructing said cell distribution section to form distribution route with reference to said function configuration.

3. The system of claim 1, wherein the first table in said control section sequentially arranges said input/output terminals along said distribution route, and further comprising:
   means for previously setting a control sequence of a receive ATM cell, and for controlling said cell distribution section to execute said flow of said receive ATM cell according to said control sequence.

4. The system of claim 3, wherein said control section arranges a number of times an ATM cell is input and output for each input/output terminal and controls said cell distribution section to repeat an input/output operation to the same input/output terminal the number of times arranged.

5. The system of claim 1, further comprising:
   means for creating a new distribution route through said electronic circuit packages by altering said relationship among transmission processes performed by said plural electronic circuit packages in said first table.

6. The system of claim 1, further comprising:
   means for re-programming said first table to vary a relationship among transmission processes performed by said electronic circuit packages, said re-programming altering said second table to cause input/output terminals of said cell distribution section to be connected to said plural electronic circuit packages in a different manner as previously connected, thereby defining a new distribution route through said electronic circuit packages.

7. The system of claim 1, wherein said cell distribution section is connected to said plural electronic circuit packages in a star-type bus configuration.

8. The system of claim 1, wherein said cell distribution section is connected to said plural electronic circuit packages in a multi-branch-type bus configuration.

9. An ATM transmission method comprising the steps of:
   preparing plural electronic circuit packages, a control section, and a cell distribution section having plurality input/output terminals connectable to said plural electronic circuit packages;
   programming a first table to define a relationship among transmission processes performed by at least a portion of said electronic circuit packages;
   programming a second table defining a distribution route through at least a portion of said electronic circuit packages, said distribution route in said second table based on said programmed relationship among said transmission processes defined in said table and being formed from connections among said at least a portion of said electronic circuit packages and respective ones of said input/output terminals of said cell distribution section; and controlling a flow of a receive ATM cell through said at least a portion of said electronic circuit packages via said distribution route.

10. The method of claim 9, further comprising the steps of:

previously setting a functional configuration of said transmission processes of said at least a portion of said plural electronic circuit packages, and instructing said cell distribution section to form a cell distribution route with reference to said function configuration.

11. The method of claim 9, sequentially arranging said input/output terminals in said routes along a cell distribution route in accordance with said second table in said control section;

previously setting a control sequence of a receive ATM cell, and controlling said cell distribution section to execute a transmission process of said receive ATM cell according to said control sequence.

12. The method of claim 11, further comprising the step of: arranging a number of times an ATM cell is input and output for each input/output terminal, and controlling said cell distribution section to repeat an input/output operation to the same input/output terminal the number of times arranged.

13. The method of claim 9, further comprising:

creating new routes through said electronic circuit packages by altering said relationship among transmission processes performed by said plural electronic circuit packages in said first table.

14. The method of claim 9, further comprising:

re-programming said first table to vary a relationship among transmission processes performed by said electronic circuit packages, said re-programming altering a manner in which input/output terminals of said cell distribution section are connected to said plural electronic circuit packages, thereby creating a new routes through said packages.

15. A virtual device for performing ATM cell transmission, comprising:

a control section including a first table defining a relationship among a plurality of electronic circuit packages, said electronic circuit packages performing respective ATM process functions;

a cell distribution section including a second table programmed to define an ATM cell distribution route passing through said electronic circuit packages, said second table being programming based on the data in the first table in said control section; and a plurality of slots, said slots connected to said electronic circuit packages based on the distribution route defined in the second table of said cell distribution section.

16. The virtual device of claim 15, wherein said first table includes data indicating whether each of said plurality of slots are usable.

17. The virtual device of claim 16, further comprising:

means for altering said distribution route when one of said slots along said distribution route is unusable, said means replacing said unusable slot with an available useable slot to allow an ATM cell to flow along said altered distribution route.

* * * * *